Nov. 2, 1965 F. E. SMITH 3,215,261
APPARATUS AND METHOD FOR MOVING PARTS
Filed April 18, 1963 6 Sheets-Sheet 1

INVENTOR.
Floyd E. Smith
BY
Dominik and Rudy
Att'ys.

Nov. 2, 1965  F. E. SMITH  3,215,261
APPARATUS AND METHOD FOR MOVING PARTS
Filed April 18, 1963  6 Sheets-Sheet 2

INVENTOR.
Floyd E. Smith
BY
Dominik and Rudy
att'ys.

Nov. 2, 1965 F. E. SMITH 3,215,261
APPARATUS AND METHOD FOR MOVING PARTS
Filed April 18, 1963 6 Sheets-Sheet 3
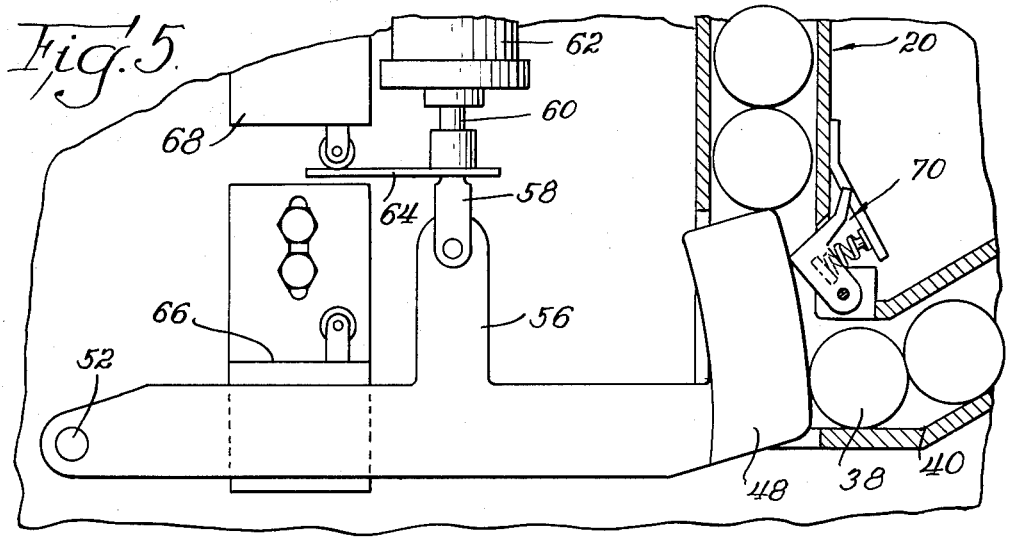
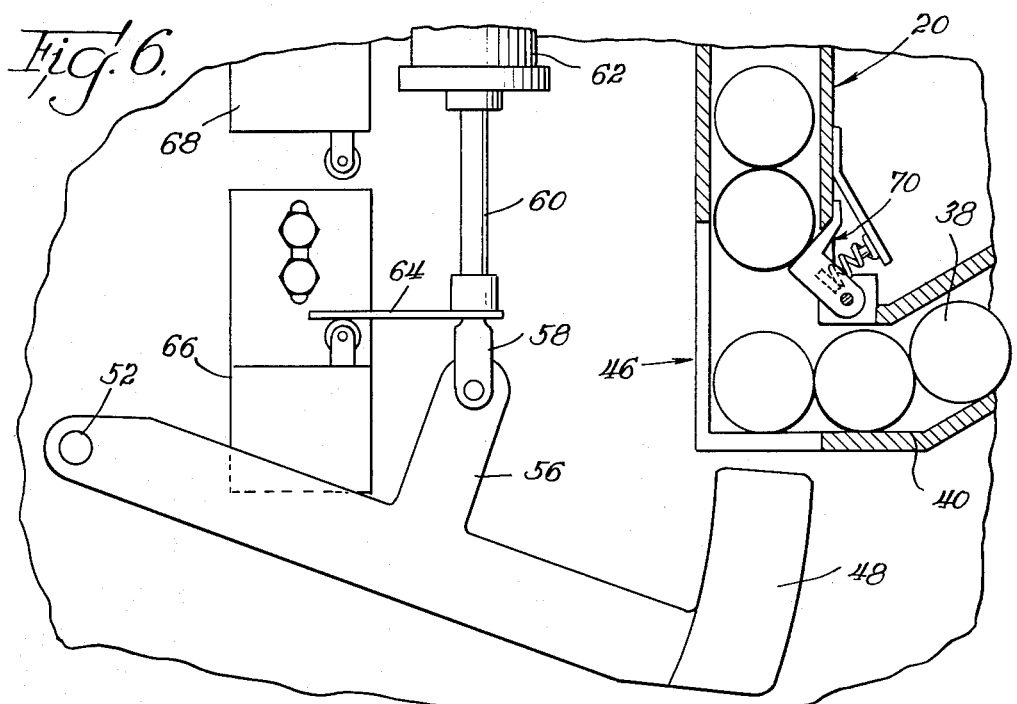
INVENTOR.
Floyd E. Smith
BY Dominik and Rudy
Att'ys.

Nov. 2, 1965   F. E. SMITH   3,215,261
APPARATUS AND METHOD FOR MOVING PARTS
Filed April 18, 1963   6 Sheets-Sheet 4
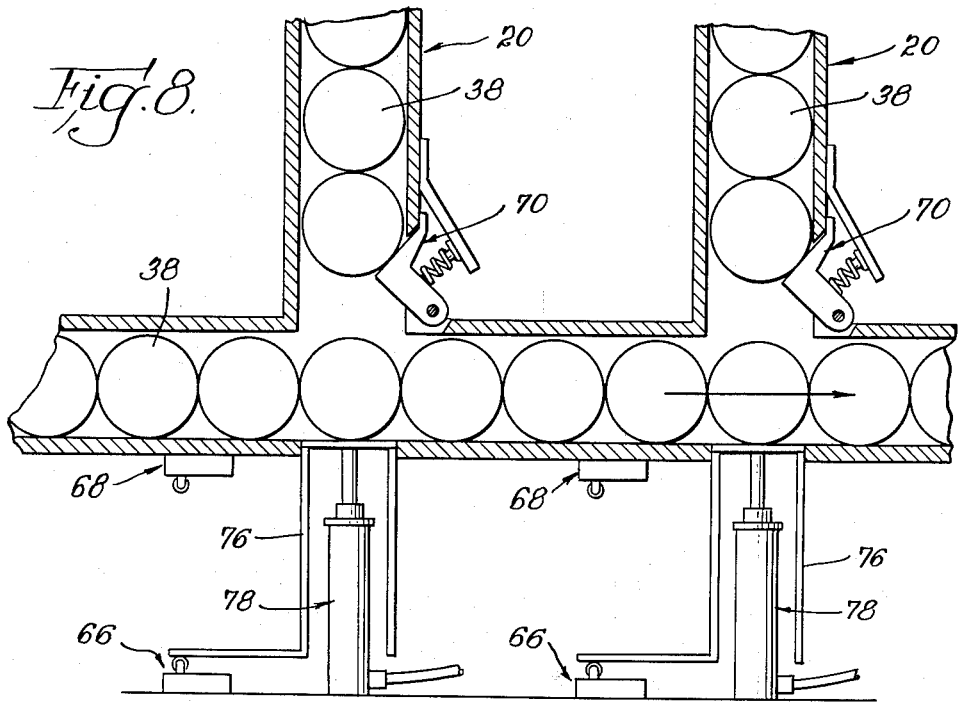
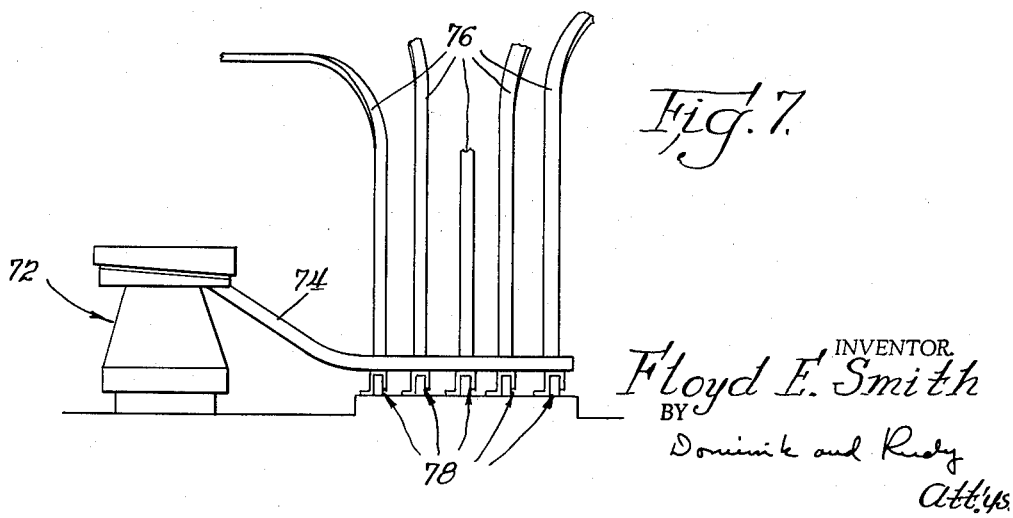
INVENTOR.
Floyd E. Smith
BY Dominik and Rudy
Att'ys.

Nov. 2, 1965   F. E. SMITH   3,215,261
APPARATUS AND METHOD FOR MOVING PARTS
Filed April 18, 1963   6 Sheets-Sheet 5
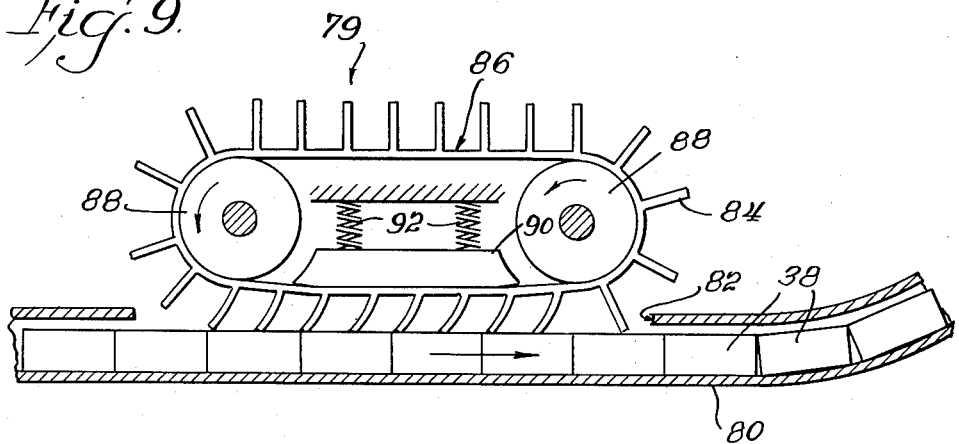
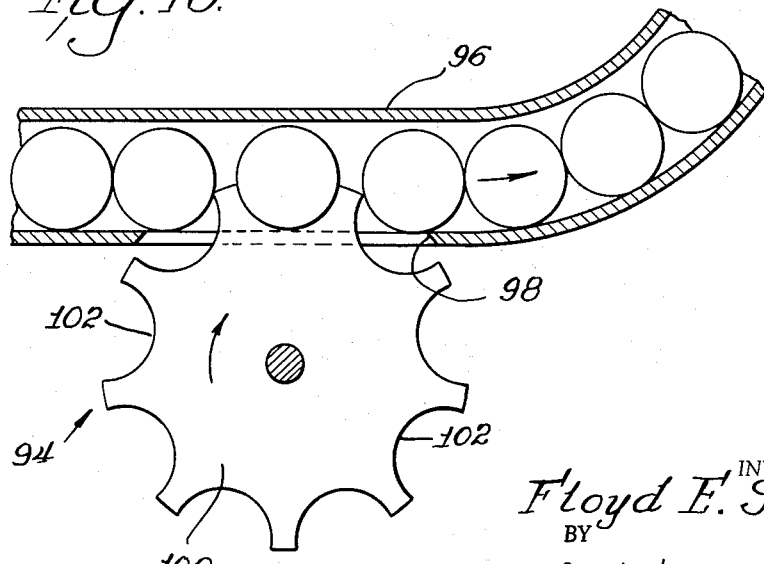
INVENTOR.
Floyd E. Smith
BY Dominik and Rudy
att'ys.

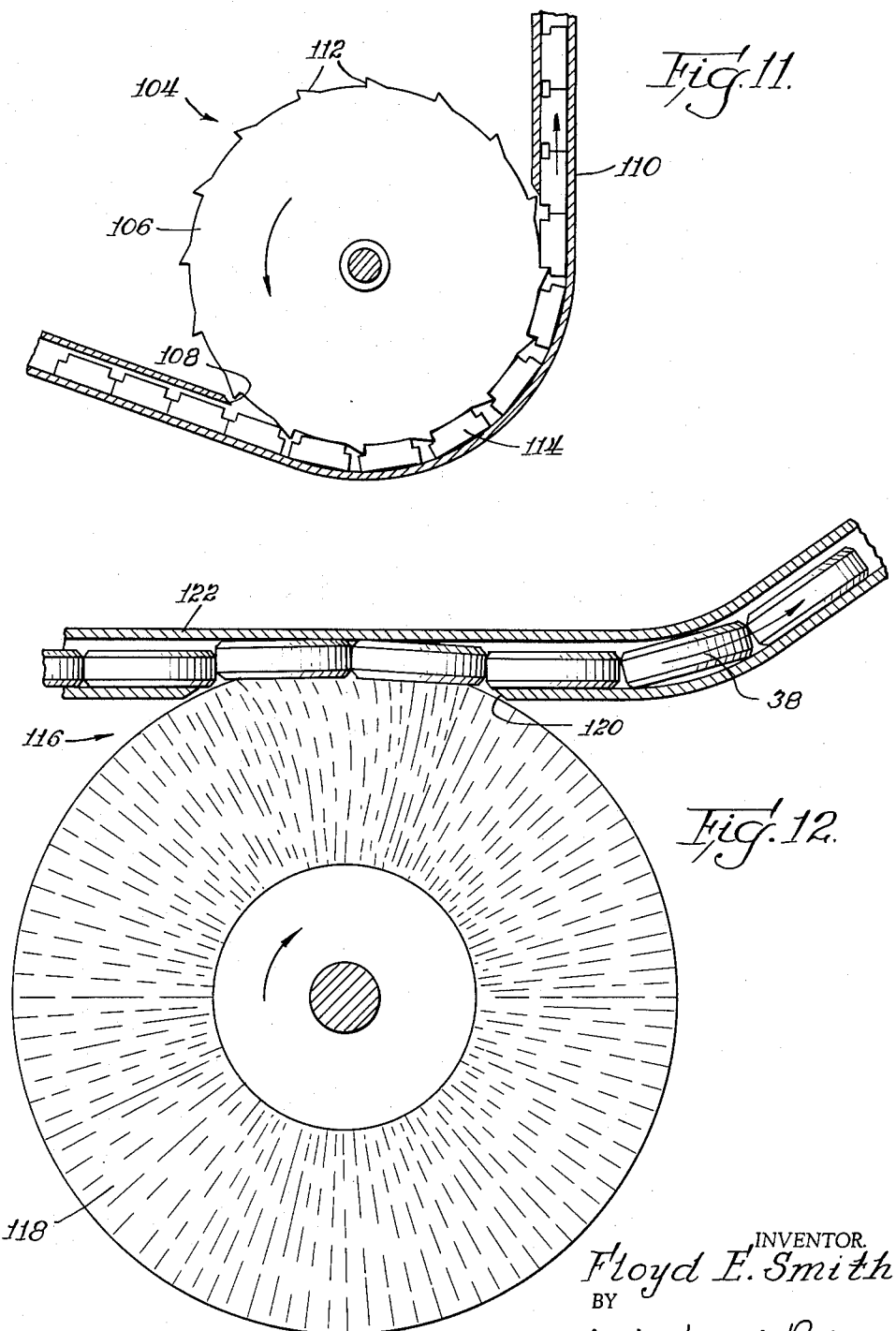

United States Patent Office 3,215,261
Patented Nov. 2, 1965

3,215,261
APPARATUS AND METHOD FOR MOVING PARTS
Floyd E. Smith, 3430 Glenside Ave., Erie, Pa.
Filed Apr. 18, 1963, Ser. No. 273,878
2 Claims. (Cl. 198—226)

The present invention relates to a method and apparatus for orienting, feeding, and transferring randomly oriented bulk parts to a remote location in a predetermined oriented condition.

In the automation of factories for assembling a whole host of products, the parts and subassemblies must be transferred from various work stations to others. Additionally, parts purchased from outside sources must be similarly so transferred. These parts, in addition to being transferred, must be oriented for feeding into the machinery and equipment for further processing. Presently available equipment and methods for accomplishing the foregoing functions seldom are adapted to perform all of these functions in a single integrated parts moving arrangement. Moreover, they fail to avail themselves of the inherent dimensional and frictional characteristics of the parts to reduce the amount of energy expended, supervision required, and rejection for various reasons at the point of delivery.

In view of the foregoing, it is a principal object of the present invention to provide an apparatus and method for *first* orienting parts, and *second* transferring and elevating the then oriented parts to remote work stations for further processing. A closely related object of the invention is to furnish the apparatus and methods for closely controlling the flow cycle while orienting and remotely delivering the various parts.

Another object of the invention is to orient and then confine the flow of parts to vastly reduce the physical volume of feeding equipment required.

Still a further object of the invention looks to the support of each part by another to eliminate costly individual handling apparatus.

Yet another object of the invention is the provision of parts moving systems including either a flexible drive means, or a positive drive means.

These and further objects and features of the invention will become more apparent from the following description and accompanying drawings wherein:

FIG. 5 is an enlarged fragmentary view of a parts advancing means used on the apparatus of FIG. 1, and showing said means in one position of operation;

FIG. 6 is the same as FIG. 5, but showing another position of operation;

FIG. 7 is a schematic illustration of still another arrangement embodying the principles of the invention;

FIG. 8 is an enlarged view of a part advancing means used in the arrangement of FIG. 7;

FIG. 9 is a view of a parts advancing means employing a caterpillar chain arrangement;

FIG. 10 is a view of a parts advancing means employing a toothed wheel arrangement;

FIG. 11 is a view of a parts advancing means employing another type of toothed wheel arrangement; and FIG. 12 is a view of a parts advancing means employing a powered brush arrangement.

Figure 1:
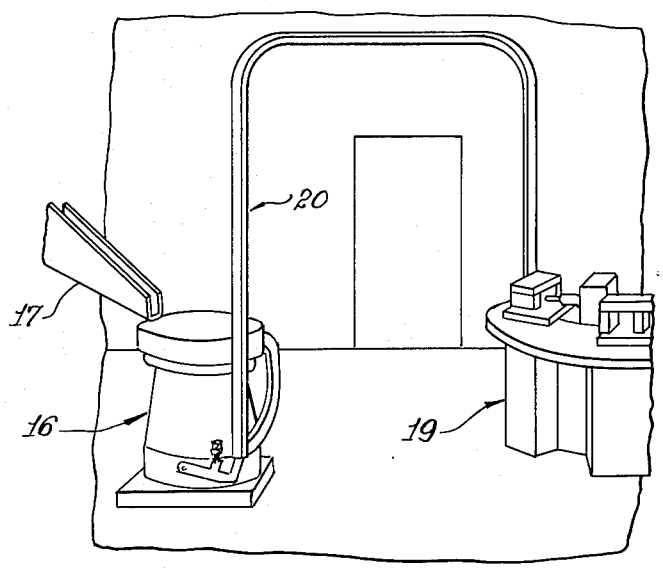
FIG. 1 is a fragmentary perspective view of a parts moving arrangement incorporating apparatus and employing a method embodying the principles of the invention.

Referring now to the drawings, FIG. 1 illustrates a parts moving arrangement wherein numeral 16 identifies an electrically powered vibratory parts feeder, which preferably is of the type manufactured and sold by Automation Devices, Inc., of Erie, Pennsylvania. The parts feeder 16, which is supplied with parts by a hopper, a chute portion 17 thereof being shown, is positioned for feeding parts in properly oriented position from a vibratory bowl 18 to a machine, or work station 19, by way of a conveyor means 20, in the form of an enclosed track or channel. The conveyor means 20 is arranged to have an internal shape which confines the parts so that they have a loose sliding fit therein and will move in oriented position. Obviously, such shape will depend upon the critical dimensions of the parts to be moved therein. A certain degree of flexibility in channel design may be obtained by making the components in easily assembled and dismantled form. It will be apparent that the conveyor means 20, may be arranged in any vertical and/or horizontal path so that parts may be delivered from a single feeder to any point of usage, in a convenient and space-saving manner, as afforded by elimination of elevator devices, hoists, ramps, platforms, bins, and other accessory parts delivery equipment. Switch means can be employed independently, or in combination in the arrangement to assure peak efficiency and operation, which switch means may be arranged to (1) regulate quantity of parts in the parts feeder, (2) control parts feeder operation to maintain a desired output delivery rate, and (3) at a final delivery point to control the overall arrangement to maintain desired reservoir of parts at point of usage.

Figure 2:
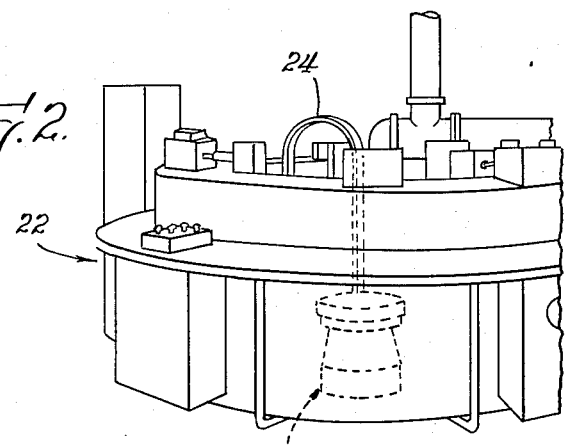
FIG. 2 is the same, but showing a modified arrangement.

Another parts moving arrangement is shown in FIG. 2, wherein the feeder 16 is positioned under, or inside of a machine, or work station 22, whereby conveyor means 24 will deliver parts up and into the machine, as desired for a given operation.

Figure 3:
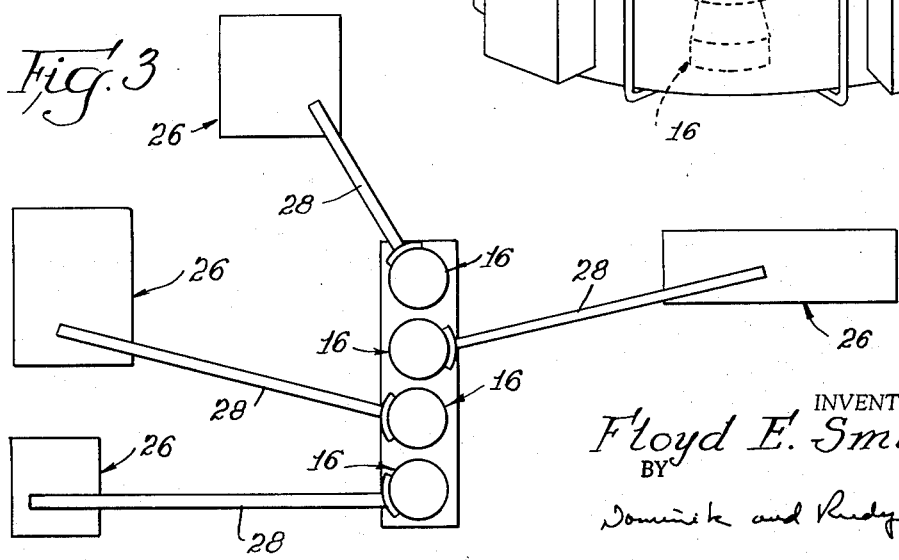
FIG. 3 is a schematic plan view illustrative of still another arrangement embodying the principles of the invention.

In FIG. 3, a parts moving arrangement is shown wherein a plurality of feeders 16 handling the same or different parts are clustered at a point in a plant, remote from machine or work stations 26, which the feeders are to serve by conveyor means 28. In such manner, great economies in space utilization may be had since such an arrangement eliminates the need to cluster parts feeders at the machines or work areas. Furthermore, it allows centralized parts supply of the feeders, thus making for more efficient feeder loading operations.

Figure 4:
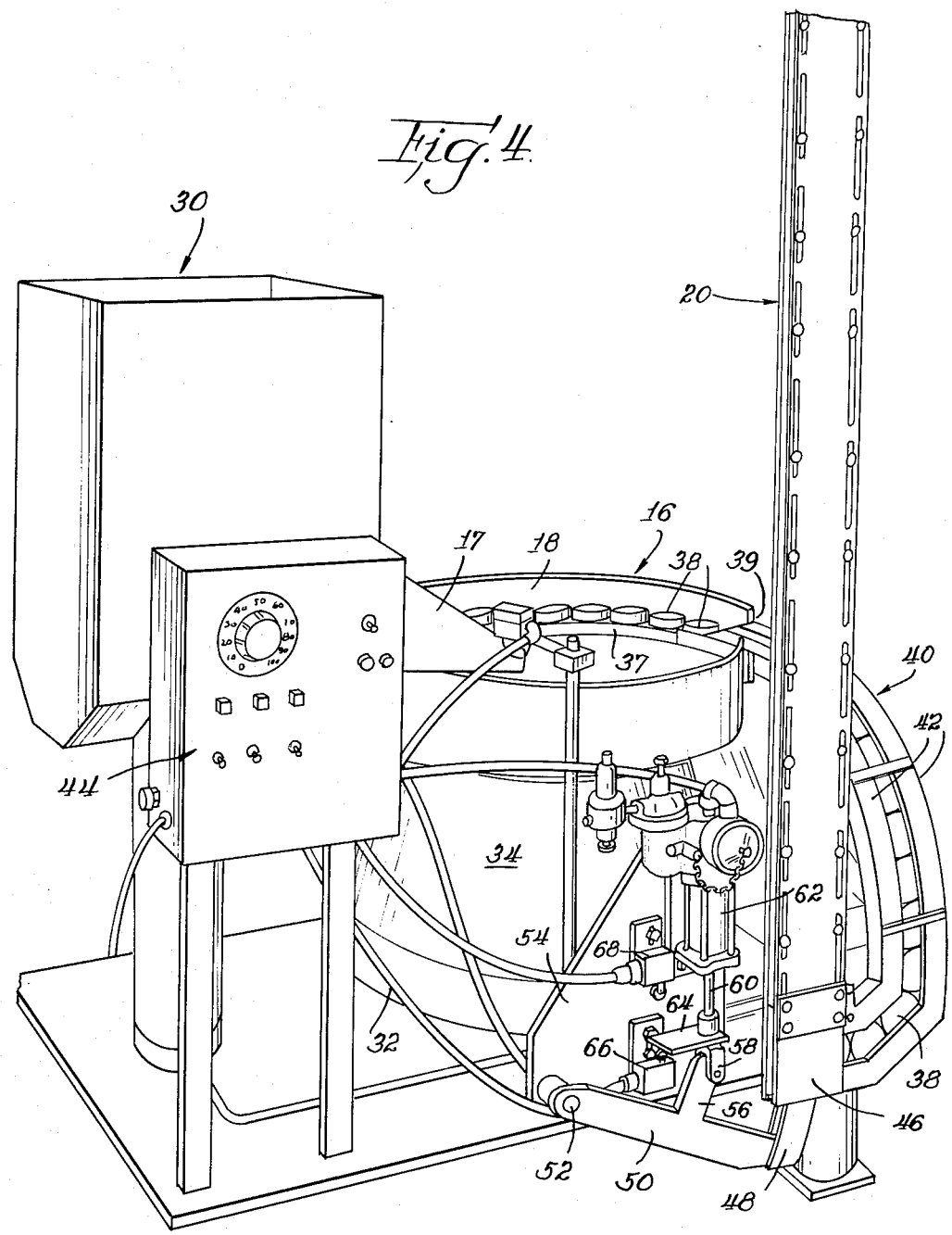
FIG. 4 is an enlarged perspective view of certain apparatus shown in FIG. 1.

A parts feeder 16 and associated feed hopper 30, as well as the initial end of a conveyor means 20, is illustrated in further detail in FIG. 4. The parts feeder 16 includes a base 32, which supports an electrical vibratory mechanism (not shown) within a frusto-conical shield 34, and a parts feeder bowl 36. The latter is designed to receive a load of similar parts 38 from the hopper 30 via the chute 17, and to deliver the parts up an inclined ramp 37 to an outlet 39 in a sequential, predetermined oriented position to a track or ramp 40. The latter may be curved downwardly so that the parts flow by gravity to the lower end of the conveyor means 20. The parts 38, illustrated by way of example, may be disc-like in shape, and are maintained in the ramp 40 between the flanges of oppositely disposed U-shaped channel irons 42, forming a major portion of the ramp. A control station 44 is provided for centralizing and housing the various electric units, and related circuitry as well as flow control valves, etc., as required for effecting overall control of the parts moving arrangement, in a manner as will be more apparent hereinafter.

An interchange means 46, at the lower end of the conveyor means 20, couples the ramp 40 to the conveyor means. A part advancing means 47, including a curved, reciprocable plunger 48, is arranged to extend into the interchange means 46 and advance the parts in the conveyor means 20. The plunger 48 forms one end of a third class lever 50, the opposite end of the lever being pivotally mounted upon a pin 52 secured to a vertically arranged plate 54. The lever 50 includes an integral arm 56, the free end of which is straddled by a clevis 58 affixed to the end of a piston rod 60, as best seen in FIGS. 5 and 6. The piston rod is secured to a piston (not shown) which is reciprocably arranged in a cylinder 62. The cylinder and piston together with the rod 60, form a motor means which is operated by pressurized fluid—pneumatic or hydraulic— to reciprocate the plunger 48 in a manner which will advance the parts upwardly in the conveyor means 20. A flat plate 64 is affixed to the piston rod 60 adjacent the clevis 58, said plate being arranged to engage adjustably positioned limit switches 66 and 68 at opposite ends of piston rod movement. Said switches are tied in with an electrical circuit arranged to sequentially operate solenoid valves adapted to direct flow of pressure fluid as required for reciprocating movement of the piston rod 60.

A spring biased latch means 70 is positioned in the region of the interchange means 46 to allow upward movement of the parts when urged by the plunger 48, but to block backflow of the parts when the plunger is not acting upon the parts. It will be noted that the plunger 48 is adapted to automatically regulate flow of parts into the interchange means 46 so that only one part at a time is positioned for upward movement under the urging of the plunger 48. The design of the plunger and power operating means must, of course, be sufficiently strong and powerful to move all the parts intermittently in the conveyor means; hence, consideration must be given to the weight of the parts being moved, frictional factor, and length of the path traversed by the parts. Such a design problem can be readily solved by those skilled in the art and talented in their chosen field of endeavor.

The parts moving arrangement illustrated in FIG. 7 is adapted to feed similar parts from a parts feeder 72 to a ramp 74 and into a plurality of conveyor means 76, leading to separate machines, or work areas (not shown). The feeder 72 is similar to feeder 16; however, the ramp 74 is designed to serve a plurality of interchange means, or stations, as best seen in FIG. 8. A parts advancing means 75, including a cylindrical plunger 76 is arranged at each interchange station, which plunger is vertically moved by a motor means 78 including a cylinder and piston assemblage. Each plunger 76 is in vertical alignment with an associated conveyor means 20, so that upward movement of the plunger 76 will force a part 38 past the latch means 70 and into the enclosed track of the conveyor means. Limit switches 66 and 68 are positioned to control operation of each motor means 78. Obviously, the operation of the motor means can be cycled so that parts will be moved in the ramp 74 and to the interchange stations in a manner which will assure regulated and uniform output of parts in all of the conveyor means under operation. In the alternative, it will be possible by selective operation of the motor means to provide different flow rates of parts in the various conveyor means as desired. In any event, the parts moving arrangement of FIG. 7 illustrates a manner in which a single feeder 72 may be disposed for simultaneously serving a plurality of remotely positioned machines, or work areas, with a given part as required in manufacturing operations.

Parts advancing means for conveyors of the type above disclosed, are illustrated in FIGS. 9 to 12; those shown in FIGS. 9 and 12 are suited for steady movement of parts wherein a flexible drive means is provided which is not positively keyed-in with the parts, while those shown in FIGS. 10 and 11 are suited for intermittent movement of parts wherein a drive means is keyed-in with the parts being moved. The latter can, of course, be positively said for the parts advancing means 47 and 75.

Referring now to FIG. 9, a parts moving system 79 is shown, for a conveyor means 80, which may be an enclosed track for conveying parts 38 between a feeder and a machine, or work area, as is the case of the conveyor means 20 and 76. An upper wall portion of the conveyor means is removed to provide an opening 82 into which is projected the flexible fingers 84 of an endless belt 86. The latter is mounted upon sheaves or wheels 88, the axis of each being in spaced parallel arrangement in a plane which is parallel with the conveyor means 80. A shoe 90 is arranged between the wheels 88, and is resiliently urged, by a spring means 92, against the inside surface of the lower flight of the belt 86, so that the fingers 84 will be in frictional engagement with the parts 38. Movement of the belt 86, in the direction indicated, will cause movement of the parts 38 toward the right in the conveyor means 80.

The material of the belt 86, and especially the fingers 84, should have a high frictional factor, such as would be afforded by rubber or equivalent. The degree of frictional engagement between the belt fingers and the parts is, of course, dependent upon factors such as, for example, belt width, material and flexibility of the fingers, engagement pressure developed by the shoe 90, all of which can be easily determined by application of sound engineering principles. The degree of the frictional engagement is a factor to be established in arriving at a design adequate to move the parts as required in any given conveyor means arrangement.

A definite advantage afforded by the parts moving arrangement of FIG. 9, is that the flexible, i.e., non-keyed-in engagement between the belt fingers and parts allows continuous operation of the belt 86, even if movement of the parts is stopped at the outlet end of the conveyor 80, as may sometimes be required. Accordingly, simplified control of the overall system is thus afforded, since there is no need to start and stop operation of the parts moving belt in synchronism with parts movement in the conveyor means. In addition, breakage of parts and/or elements of the parts moving system, is avoided in cases where the flow of parts is interrupted at the delivery end of the conveyor means.

A parts moving system 94 illustrated in FIG. 10, is adapted for moving parts in a conveyor means 96 which is similar to conveyor means 80, except that an opening 98 is provided in the lower wall portion of the conveyor means 96. A wheel 100 is rotatably supported for projection of a peripheral portion into the opening 98. The wheel has a plurality of equi-angularly spaced semi-circular notches 102 formed about the periphery, which notches are of equal radius to that of the disc-like parts 38. Rotation of the wheel 100 will result in the sequential engagement of each notch 102 with successive parts 38 so that the parts are moved forwardly in touching relation in the conveyor means 96 to point of usage.

The parts moving system 94 differs from system 79 insofar as a positive drive is provided wherein the drive means is keyed-in with the parts being moved, which results in steady, but intermittent movement of the parts.

A parts moving system 104 illustrated in FIG. 11, provides the same type of parts movement as in the case of the system 94, namely, steady but intermittent movement. A wheel 106 is rotatably supported for projection into an opening 108 provided in the upper surface of an enclosed channel forming a conveyor means 110. The wheel has has a plurality of equi-angularly spaced teeth 112, which are adapted to engage an edge of a part 114 being moved in the conveyor means. It will be noted that rotation of the wheel will result in sequential engagement of each tooth 112 with successive parts 114 so that the parts will be moved forwardly in touching relation in the conveyor means 110 to point of usage.

A parts moving system 116 illustrated in FIG. 12 is similar in action to system 79, namely, a steady movement of parts is effected; however, flow of parts can be stopped without cessation of operation of the moving system. A circular, rotatable brush 118 is arranged for projecting into an opening 120 provided in the lower surface of an enclosed channel forming a conveyor means 122. The bristles of the brush 118 are adapted to frictionally engage the parts 38 being moved in the conveyor means. Rotation of the brush will result in movement of the parts in the conveyor means to point of usage. Like the parts moving system 79, the brush 118 may be rotated at a given speed without need to synchronize its rotation with starting and stopping of parts movement. Accordingly, simpler control means can be used, and there is no danger of parts breakage, or damage to the brush and drive means therefor (not shown) when part movement is interrupted at the delivery end of the conveyor means 122. The degree of frictional engagement between the brush 118 and the parts 38 will depend upon various factors, such as the stiffness and material of the brush bristles, the pressure of the bristles upon the parts, etc., all of which can be determined by application of known engineering principles.

The parts moving systems disclosed with reference to FIGS. 9 to 12, as well as the positive parts movement systems shown in FIGS. 5, 6 and 8, may be selectively used to cover many different applications in actual practice.

It will be apparent from the foregoing that the parts advancing arrangement and associated parts moving systems above disclosed, will satisfy all of the objectives set forth hereinbefore.

The foregoing description has been given in detail without thought of limitation since the invention principles involved are capable of assuming other forms without departing from the spirit of the invention or the scope of the following claims.

What is claimed is:

1. A parts moving arrangement including, in combination: a vibratory parts feeder and a conveyor means, said parts feeder having a vibratory bowl provided with an outlet for parts moving up an inclined ramp to the outlet; a downwardly inclined track for receiving oriented parts from the outlet; an interchange means for coupling the inclined track to the conveyor means; and parts advancing means to positively engage each part entering said interchange means and intermittently advance the part in the conveyor means, each part serving to advance the part ahead of it in the conveyor means, said parts advancing means including a reciprocal plunger arranged to engage a single part in the interchange means, motive means to cause said plunger to move said parts into the conveyor means, and control means for controlling the operation of said motive means to cause reciprocal movement of said plunger wherein said parts are moved in sequential order into the conveyor means, said control means including adjustably positioned switch means coupled to said motive means and engageable by said plunger to operate said motive means and to limit end of stroke movement of the plunger in either direction of reciprocal movement.

2. A parts moving arrangement including, in combination: a vibratory parts feeder and a conveyor means, said parts feeder having a vibratory bowl provided with an outlet for parts moving up an inclined ramp to the outlet; a downwardly inclined track for receiving oriented parts from the outlet; an interchange means for coupling the inclined track to the conveyor means; and parts advancing means to positively engage each part entering said interchange means and intermittently advance the part in the conveyor means, each part serving to advance the part ahead of it in the conveyor means, said parts advancing means including a reciprocal plunger arranged to engage a single part in the interchange means, fluid operated motive means including a cylinder and a piston, a piston rod secured at one end to said piston and at its other end to said plunger and solenoid valve means adapted to direct flow of pressurized fluid to said cylinder as required to reciprocate said piston and said piston rod to cause said plunger to move said parts into the conveyor means; and control means including adjustably positioned switch means engageable by said plunger to sequentially operate said solenoid valve means to operate said plunger and to limit end of stroke movement of said plunger in either direction of reciprocal movement.

References Cited by the Examiner

UNITED STATES PATENTS 1,439,807 12/22 Ericson.
2,725,971 12/55 Clark-Riede _____ 198—33.1

HUGO O. SCHULZ, *Primary Examiner.*